Sept. 5, 1967 A. V. MILLER ETAL 3,339,479

PORTABLE SPIT

Filed Sept. 7, 1965

INVENTORS
PAUL H. RICHARDS
ARCHIE V. MILLER
CARL MULLER

BY *Wills & St.John*
ATTYS.

3,339,479
PORTABLE SPIT
Archie V. Miller, Carl Muller, and Paul H. Richards, Spokane, Wash.; said Miller and said Muller assignors to said Richards and Paul Brown, Torrance, Calif.
Filed Sept. 7, 1965, Ser. No. 485,292
3 Claims. (Cl. 99—421)

ABSTRACT OF THE DISCLOSURE

The structure disclosed provides a portable spit wherein a spit is supported by upright posts and is driven by a motor and transmission unit. A rigid driving shaft assembly is coupled from the motor and transmission unit which rests on the ground surface, to an angular coupling drivingly connected to the spit. The motor and transmission unit itself acts as a reaction member providing mechanical leverage to the rigid shaft assembly to rotatably control the movement of the spit. The motor and transmission unit is displaced from the heat of the assembly and the entire apparatus is easily erected or disassembled.

---

This invention relates to a portable cooking apparatus in the form of a motor driven spit that can be located above any source of heat for grilling meats and other foods during rotation of the food.

This invention has as its object the provision of a relatively simple motor driven unit for roasting meats and other foods above a fire or bed of coals, the unit being easily assembled and readily carried from one location to another. The motor and transmission unit is located at a safe distance from the heat involved and is not rigidly attached to any other member so that it can be readily placed in use or removed when desired.

It is a first object of this invention to provide a simple three-piece portable cooking unit for roasting meats and other foods above an open source of heat. The apparatus is designed to be placed on bare ground, the motor unit being compeltely free and unattached to any supporting device.

Another object of this invention is to provide an unattached driving unit for a portable spit using a socket coupling to the spit that can be readily slipped into place or removed. The motor itself is at a remote location so that it can be operated without damage due to heat.

These and further objects will be evident from the following disclosure, together with the accompanying drawings, which illustrate a preferred form of the invention. It is to be understood that this form of the invention is only exemplary, and that it is not intended to limit the scope or extent of the invention, which is defined in the claims that follow.

Figure 1:
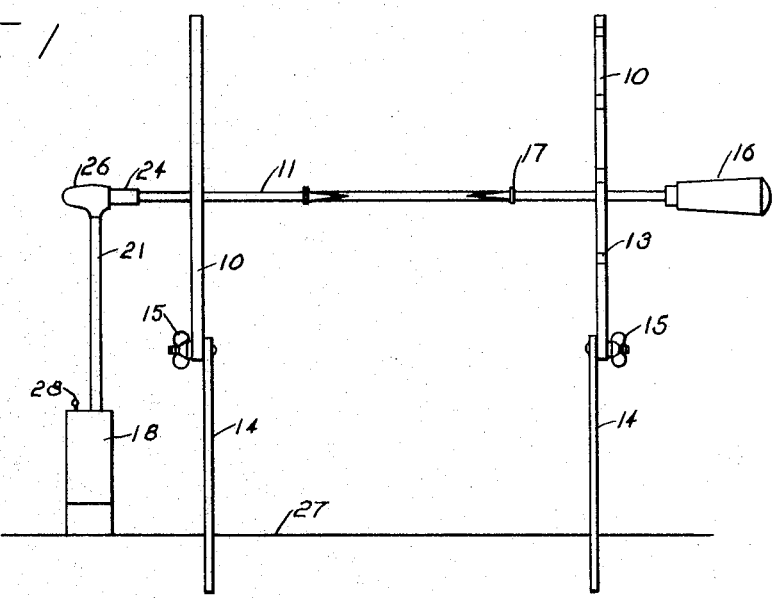
FIGURE 1 is a side elevation view of a portable cooking apparatus constructed according to the invention.
Figure 2:
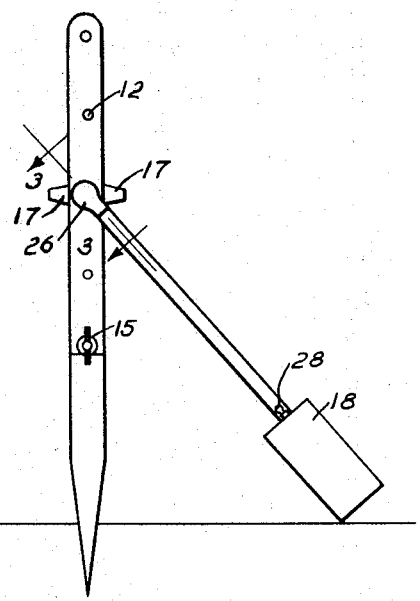
FIGURE 2 is an elevational end view taken from the left hand end of FIGURE 1.

Referring to the drawings, there is shown a portable cooking apparatus including two upright standards 10 that support a transverse rotatable spit 11 for rotation about its central longitudinal axis. The standards 10 are preferably made of metal plate, having suitable apertures or recesses for rotatably supporting spit 11. As seen in the drawings, the left hand standard shown in FIGURE 1 and FIGURE 2 is provided with circular bearing apertures 12, while the right hand standard 10 is shown with slots 13 that angle downwardly so that the spit 11 can be easily removed. Each standard 10 is shown supported by a pointed lower section 14 pivotally connected to its lower end, the section 14 being releasably locked by a wing nut 15. Wing nuts 15 permit the sections 14 to be folded back upon the main portions of standards 10 for portability. Other types of base sections, such as pedestals, could be substituted in place of the pointed section 14.

The spit 11 has a polygonal cross section, commonly square in shape. It is provided with an insulated outer handle 16 and a pair of releasable pronged clamps 17. Meat or other food held on spit 11 is engaged by the oppositely directed pronged clamps 17 for rotation with the spit 11.

Figure 3:
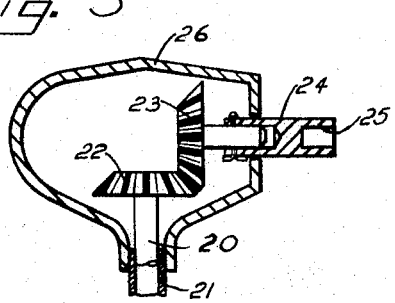
FIGURE 3 is an enlarged cross sectional view taken through the gear head at the top of the driving unit along line 3—3 in FIGURE 2.

Spit 11 is powered by a driving unit shown to the left in FIGURE 1. This comprises a motor and transmission unit 18 enclosed in a suitable protective casing. The output shaft of the unit 18 is connected to an extension shaft or flexible cable 20 (FIG. 3) that is encased within a housing 21 that is fixed relative to the casing 18. At its outer end, shaft 20 is suitably coupled through gears 22 and 23 to a socket 24 having an aperture 25 complementary to the exterior of the outer end of spit 11. The gears 22, 23 are protected within a suitable fixed housing 26 fixed to the housing 21.

The radial length of the motor unit within casing 18 and housings 21, 26 relative to the central longitudinal axis of spit 11 is greater than the elevation of spit 11 relative to the ground level 27 on which the standards 10 are supported. Therefore, the outer end of the drive unit rests freely on the ground surface and acts as a reaction member to prevent rotation of the motor unit relative to the spit axis. The motor unit does not otherwise have to be attached to any member or support. It could be readily placed on the spit 11 or removed at any time.

By placing the motor and transmission unit 18 at ground level offset from the area directly beneath the spit 11, the heat to which it will be subjected is greatly lessened, thereby increasing the life and operation of the powered elements. In addition, the motor and transmission unit can be easily operated without the danger of burning one's hands.

The mechanisms used in the motor and transmission unit 18 are conventional. A battery operated motor and suitable transmission to provide the desired output speed at the spit 11 are all that are required. As illustrated, the control switch handle 28 for the unit 18 is preferably mounted on its protective casing so that the entire device is a single element easily carried in one's hand and readily mounted in place when desired.

Various modifications could be made with respect to the elements described without deviating from my basic invention. Therefore, only the following claims are intended to limit the scope of the invention disclosed herein.

Having thus described our invention, we claim:

1. A portable cooking apparatus, comprising:
   a pair of upright standards positioned at opposite sides of a heat source located on a supporting surface;
   a spit rotatably journalled on said standards about a transverse horizontal axis;
   a driving unit operatively connected to said spit, comprising:
   a motor and transmission unit having a rotatable driven shaft;
   a rigid extension mounted on said motor and transmission unit and including a shaft drivingly coupled to the driven shaft of said motor and transmission unit;
   a socket releasably coupled to one end of said spit;
   gear means drivingly connecting said socket and the outer end of said extension shaft, the rotational axis of said extension shaft being perpendicular to the axis of said spit;

the radial length of said driving unit relative to the axis of said spit being greater than the vertical elevation of the axis of said spit above said supporting surface.

2. A portable cooking apparatus as defined in claim 1, further comprising:

a sealed protective casing surrounding said motor and transmission unit;

and protective housing means surrounding said extension shaft and said gear means, said housing means being fixed relative to said casing.

3. In a portable spit cooking apparatus for use on a surface wherein the cooking apparatus includes upright standard means supported by the surface and a horizontal spit rotatably journalled by said upright standard means, a driving unit comprising:

a motor and transmission unit having a rotatable driven shaft;

angular motion transmitting means coupled to said spit, including a driven member coaxial with the spit and releasably connected thereto, and a driving member rotatable about an axis non-parallel to the spit axis, the axis of said driving member being fixed angularly relative to the spit axis;

rigid shaft means operatively connecting the driven shaft of said motor and transmission unit and the driving member of said angular motion transmitting means;

the total radial length of the driving unit relative to the spit axis being greater than the elevation of the spit axis above the surface, whereby the motor and transmission unit is capable of resting freely on the surface while drivingly connected to said spit.

References Cited

UNITED STATES PATENTS

| | | | |
|---|---|---|---|
| 2,388,831 | 11/1945 | Cramer | 99—421 |
| 2,477,183 | 7/1949 | Humensky | 99—421 |
| 2,608,149 | 8/1952 | Ellis | 99—421 |
| 2,654,307 | 10/1953 | Nisenson | 99—421 |
| 3,106,150 | 10/1963 | Gaeke | 99—421 X |

FOREIGN PATENTS 248,145   6/1960   Australia.

WALTER A. SCHEEL, *Primary Examiner.*

A. O. HENDERSON, *Assistant Examiner.*